United States Patent [19]

Dvorkis et al.

[11] Patent Number: 5,369,262
[45] Date of Patent: Nov. 29, 1994

[54] ELECTRONIC STYLUS TYPE OPTICAL READER

[75] Inventors: Paul Dvorkis, Stony Brook; Ralph Thomas, East Patchogve; David Goren, Ronkonkoma, all of N.Y.; Robert Fuller, Pataskala, Ohio; Leonard H. Goldner, Cold Spring Harbor, N.Y.

[73] Assignee: Symbol Technologies, Inc., Bohemia, N.Y.

[21] Appl. No.: 100,220

[22] Filed: Aug. 2, 1993

Related U.S. Application Data

[62] Division of Ser. No. 892,889, Jun. 3, 1992.

[51] Int. Cl.$^5$ .............................................. G06K 7/10
[52] U.S. Cl. ................................... 235/472; 235/462; 235/454; 235/440; 382/59; 345/179
[58] Field of Search ............... 235/462, 472, 454, 440, 235/470; 382/59, 65; 345/156, 179; 178/18, 19

[56] References Cited

U.S. PATENT DOCUMENTS

| | | | |
|---|---|---|---|
| 4,180,204 | 12/1979 | Koenig et al. | 382/59 X |
| 4,263,592 | 4/1981 | Takahashi et al. | 235/472 |
| 4,329,684 | 5/1982 | Monteath et al. | 235/462 X |
| 4,581,761 | 4/1986 | Ichinokawa et al. | 382/59 X |
| 4,748,318 | 5/1988 | Bearden et al. | 235/472 X |
| 4,906,843 | 3/1990 | Jones et al. | 235/472 |
| 4,972,496 | 11/1990 | Sklarew | 382/59 X |

FOREIGN PATENT DOCUMENTS

| | | | |
|---|---|---|---|
| 5074634 | 6/1980 | Japan | 345/179 X |

*Primary Examiner*—Donald Hajec
*Assistant Examiner*—Esther H. Chin

[57] ABSTRACT

An electronic stylus, for use with a computer having a digitizer, has a light emitter for emitting light to illuminate optically encoded information. A photodetector senses light reflected from the illuminated optically encoded information and produced an electrical signal representative of the optically encoded information. Stylus electronics provide positional input data by contacting a digitizer tablet with the stylus. The stylus housing contains the light emitter, photodetector and stylus electronics. A tip at a fore end of the housing is adapted for contact with the digitizer tablet and the light is emitted from other than the fore end of the housing.

12 Claims, 7 Drawing Sheets

ELECTRONIC STYLUS TYPE OPTICAL READER

This is a division, of application Ser. No. 892,889 filed Jun. 3, 1992 pending.

TECHNICAL FIELD

The instant invention relates to devices for reading optically encoded information of varying densities, for example bar codes, and to associated data input devices.

BACKGROUND ART

Optically encoded information, such as bar codes, have become quite common. A bar code symbol consists of a series of light and dark regions, typically in the form of rectangles. The widths of the dark regions, the bars, and/or the widths of the light spaces between the bars indicates the encoded information. A specified number and arrangement of these elements represents a character. Standardized encoding schemes specify the arrangements for each character, the acceptable widths and spacings of the elements the number of characters a symbol may contain or whether symbol length is variable, etc.

To decode a bar code symbol and extract a legitimate message, a bar code reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol. As the wand passes over the bar code, the emitter and associated optics produce a light spot which impacts on the code, and the detector senses the light reflected back from the light spot passing over each symbol of the code. Alternatively, an optical moving spot scanner scans a light beam, such as a laser beam, across the symbol; and a detector senses reflected light from the beam spot scanned across the symbol. In each case, the detector produces the analog scan signal representing the encoded information.

A digitizer processes the analog signal to produce a pulse signal where the widths and spacings between the pulses correspond to the widths of the bars and the spacings between the bars. The pulse signal from the digitizer is applied to a decoder which first determines the pulse widths and spacings of the signal from the digitizer. The decoder then analyzes the widths and spacings to find and decode a legitimate bar code message. This includes analysis to recognize legitimate characters and sequences, as defined by the appropriate code standard.

Different bar codes have different information densities and contain a different number of elements in a given area representing different amounts of encoded data. The denser the code, the smaller the elements and spacings. Printing of the small size denser symbols on an appropriate medium is exacting and thus is more expensive than printing large size low resolution symbols.

A bar code reader typically will have a specified resolution, often expressed by the size of its effective sensing spot. The resolution of the reader is established by parameters of the emitter or the detector, by lenses or apertures associated with either the emitter or the detector, by the threshold level of the digitizer, by programming in the decoder, or by a combination of two or more of these elements.

In a laser beam scanner, the effective sensing spot may correspond to the size of the beam at the point it impinges on the bar code. In a wand using an LED or the like, the spot size can be the illuminated area, or the spot size can be that portion of the illuminated area from which the detector effectively senses light reflections. By whatever means the spot size is set for a particular reader, the photodetector will effectively average the light detected over the area of the sensing spot. In one prior art example, U.S. Pat. No. 4,675,531 to Clark et al., an LED illuminates the bar code and images the code onto a photodetector. The aperture of the photodetector determines the resolution or "spot size." In the Clarke et al. system the photodetector effectively averages the light detected over the area of the aperture.

A high resolution reader has a small spot size and can decode high density symbols. The high resolution reader, however, may have trouble accurately reading low density symbols because of the lower quality printing used for such symbols. This is particularly true of symbols printed by a dot matrix type printer. The high resolution reader may actually sense dot widths within a bar as individual bar elements. In contrast, a low resolution reader detects an average intensity using a large spot size and can decode low density noisy symbols. However, a reader for relatively noisy symbols of low density, such as the dot matrix symbols, senses and averages such a wide spot that two or more fine bars of a high resolution symbol may be within the spot at the same time. Consequently, a reader having a low resolution, compatible with dot matrix symbols, can not accurately read high density symbols. Thus any reader having a fixed resolution will be capable of reading bar codes only within a limited range of corresponding symbol densities.

Commonly assigned U.S. patent application Ser. No. 07/735,573 filed Jul. 25, 1991, to Barkan et al., discloses a wand or scanner system for reading optically encoded information having a wide range of densities. The system includes either optical or electronic means to derive two or more channels of data from each scan pass of the wand or scanning beam over a bar code. Each channel of data has a different resolution, and the proposed system analyzes data from the two channels to obtain a valid result over a wide range of information densities. The optical and/or electronic solutions proposed in that application, however, are complex. The resulting system becomes costly, and the wand or scanner becomes larger and heavier due to the added components. A large, heavy handheld unit causes fatigue and discomfort when a user must hold and operate the unit for protracted periods.

Clearly a need exists in the art for a bar code reader which can be readily adapted to reading of bar codes over a wide range of symbol densities without adding undue complexity.

Another problem relates specifically to contact wand type bar code readers. Typically, such wands include an LED for emitting light to illuminate the bar code and a lens for focusing the widely divergent light from the LED onto the bar code. In many such wands, the lens is part of the actual tip of the wand, and consequently, the front surface of the lens contacts the surface on which the bar code is formed during scanning of the code symbols. Repeated use of the wand causes wear and scratching of the front surface of the lens. Such damage degrades the optical properties of the lens and reduces performance of the wand. As a result, the lens must be periodically replaced. Physical replacement of the lens, however, is time consuming and costly.

Further problems arise from association of the optical reader with other devices connected to a common computer system. In actual use, the device for reading optically encoded information typically connects to some form of computer. Often a need exists for entry of other data, in addition to that scanned by the optical reader. For example, in an inventory system using bar code readers the operator scans an item and then enters the quantity of such items presently in stock. Consequently, in most systems using optical readers of the type discussed above, the system will include additional data entry devices coupled to the same computer. Separate data entry devices, however, are often inconvenient to carry along in conjunction with a portable optical reading device. Also, the use of multiple data input devices requires use of several of the option card slots of the computer and additional physical wiring connections. Furthermore, multiple input devices often create software problems directing the multiple data input streams to a single application program running on the computer.

To alleviate these problems, a number of optical readers incorporate a keyboard and an alphanumeric display to form an integrated data entry terminal. These integrated terminals have included both contact wand type bar code readers and pistol grip type moving spot scanners. The data entry capabilities of such integrated terminals, however, have been limited by the nature of the keyboard and display.

A number of other types of data entry devices are known, and in many applications provide more convenient or "user friendly" data entry operation than do keyboards and alphanumeric displays. For example, a mouse allows a computer operator to move a cursor to point at an option illustrated on a display screen. The operator then "clicks" a button on the mouse to select the particular option. The mouse can also provide graphics data input. U.S. Pat. No. 4,906,843 to Jones et al. discloses a combination mouse and optical scanner, but the optical scanner scans characters or graphics data, not optically encoded information such as bar codes. The user manually scans characters by moving the mouse across the surface on which the characters appear.

A number of other keyboardless, data entry terminals have been proposed. U.S. Pat. No. 4,972,496 to Sklarew, for example, discloses a terminal device having a flat transparent input screen for generating input information when an operator contacts the screen with a stylus. A display screen mounted below the input screen displays symbols and graphic information drawn by the stylus. The operator inputs information into the associated computer through pen strokes essentially as if writing on a tablet with a pen. U.S. Pat. No. 4,916,441 to Gombrich discloses a handheld terminal including a non-contact point source type bar code reader and a touch sensitive display screen.

From the above discussion it should be clear that a need still exists to further develop various computer input devices integrated with means to scan optically encoded indicia which also provide convenient operation.

DISCLOSURE OF THE INVENTION

Objectives

One objective of this invention is to provide a bar code reader which is more convenient and efficient to use when reading encoded information over a wide range of densities.

In contact wand type embodiments, it is a further object of the invention to eliminate contact of the optical elements of the wand with the surface scanned in order to eliminate wear and damage to the optical components.

Another objective of the present invention is to provide an integrated data entry terminal for optically reading encoded information and for convenient input of other forms of data.

More specifically, one objective is to combine a bar code reader with a display and touch sensitive type data entry terminal, particularly where the bar code reader is a moving spot scanner. Alternatively it is an objective to incorporate a bar code reader, for example, the moving spot scanner, into the stylus of a graphic data input device. In another alternative, the moving spot bar code scanner is incorporated into a mouse type computer data entry device.

SUMMARY

The invention comprises a stylus for input of positional data to an electronic digitizer tablet which also incorporates elements of an optical reader. In its broadest form the stylus would include a light emitter, a photodetector and the necessary electronics for operation as a stylus, all contained with a stylus type housing. The stylus electronics would correspond to the type of tablet being used and can take a variety of forms. For example, the stylus could apply a voltage to the tablet to facilitate resistive detection of the contact point on the surface of the digitizer tablet. Alternatively, the stylus could form a light pen, or provide a capacitive contact, etc. In the illustrated embodiments, the light emitter would comprise a moving spot laser scanner module; but the emitter and photodetector could correspond to the elements of a contact wand type reader. The stylus can connect to the tablet and/or an associated computer via a cable, or the stylus can include a battery and a wireless transmitter to send information signals to the computer.

Typically, the light beam emitted by the scanners of the present invention will be in the visible range of the spectrum, for example red light. Consequently, the beam scan across the code or indicia will be visible to the operator. Also, the decode logic can provide a "beep" signal as an audible output upon detection of a valid read result. The visible beam and the "beep" signal provide feedback to the operator as to the operation of the scanner.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1A:
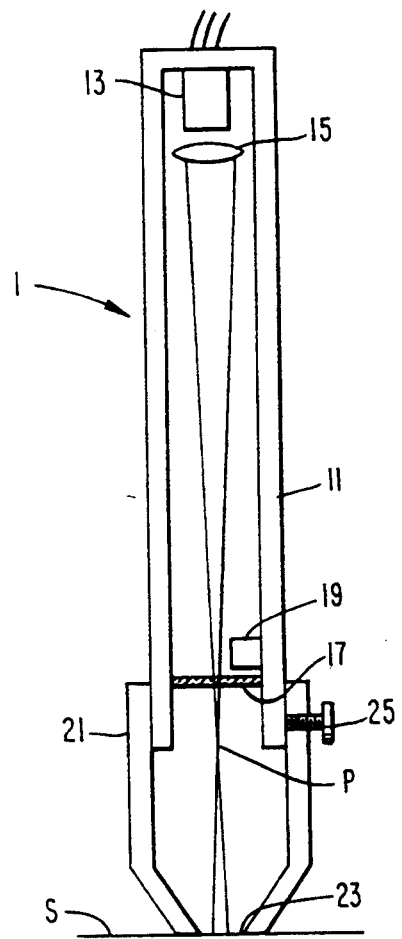
FIGS. 1A and 1B illustrate in cross section a first embodiment of the invention, in the form of a wand type reader, with an adjustable spacer set at two different positions to provide two different beam spot sizes.
Figure 1B:
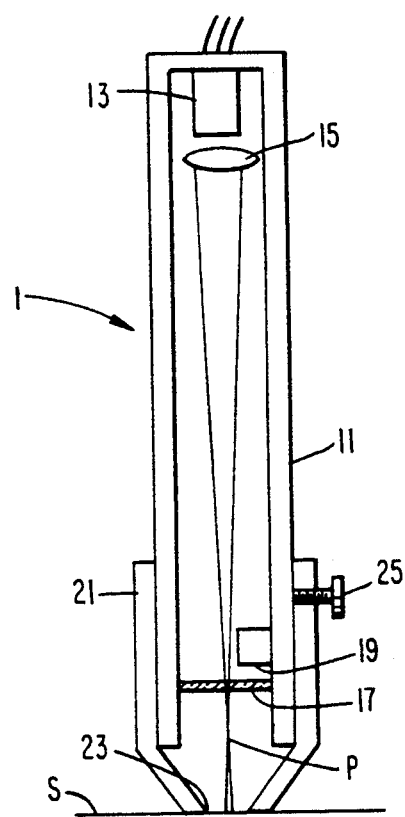

As shown in FIGS. 1A and 1B, the bar code wand 1 of the first embodiment includes a cylindrical housing 11 which contains a light emitter, such as a visible light laser diode (VLD) 13. The VLD 13 emits light which passes through an optical element, such as lens 15. The lens 15 focuses the laser light to a point P. The focused light passes through a transparent member 17 which serves to seal the wand against dust and debris. The housing 11 also contains a light sensitive photodetector 19, located behind the transparent sealing member 17, for sensing light reflected back from information scanned using the wand.

Since the wand uses a focused laser beam, no aperture is needed to define the sensing spot. Instead, the sensing spot of the laser wand corresponds to the size of the area illuminated by the beam and the diameter or spot size of the beam itself at the point where the beam impacts on the surface being scanned. As illustrated by comparison of FIGS. 1A and 1B, as the emitted light passes beyond the focal point P, the light diverges. At points close to the focal point, the beam diameter will be small, whereas at points further beyond the focal point the beam diameter will be larger. Thus, for different distances from the focal point, the beam will produce different size sensing spots which will be effective for reading different sizes and densities of symbols of optically encoded information.

The wand also includes a spacer member 21. The inside diameter of the distal end of the spacer 21 is slightly larger than the outside diameter of the fore end portion of the housing 11. Thus the spacer 21 can be slideably mounted on the fore end portion of the housing 11. When the spacer is in a desired position for reading a particular density, an operator tightens set screw 25 to secure the spacer in position. The fore end of the spacer 21 tapers to a point through which is formed aperture 23. Light from the VLD emerges from the aperture 23.

In use, an operator holds the wand in one hand and places the tip of the wand against the surface S on which is formed the encoded information, e.g. the bar code. To scan the information, the operator moves the wand across the symbols while maintaining contact of the tip of the spacer 21 with the surface S. Because the light beam diverges, the beam spot size at the point where the light impacts on the information surface will be determined by the distance from the focal point.

Comparison of FIG. 1A to FIG. 1B demonstrates how repositioning of the spacer will produce different beam spot diameters on the surface of the information during scanning. In FIG. 1A, the spacer is mounted relatively far forward on the fore end of the housing 11. When the tip of the spacer contacts the surface S, the distance between the focal point P and the surface S is relatively long, and the beam spot is large. The large beam spot would be appropriate for reading low density encoded information, such as dot matrix printed bar codes. In contrast, in FIG. 1B the operator has telescoped the spacer back on the housing. When the tip of the spacer contacts the surface S, the distance between the focal point P and the surface S is relatively short, and the beam spot is small. The small beam spot would be appropriate for reading high density encoded information, such as very small size bar code symbols.

The invention of FIGS. 1A and 1B allows an operator to adjust a single wand to read a range of symbol densities. To change from a setting for one density to a new setting for another density, the operator simply loosens set screw 25, moves the spacer to a new position, tightens the set screw 25 and scans the wand 1 across the optically encoded information. If scanning is unsuccessful, the operator can repeat this procedure at another setting until the scanning is successful.

Figure 2A:
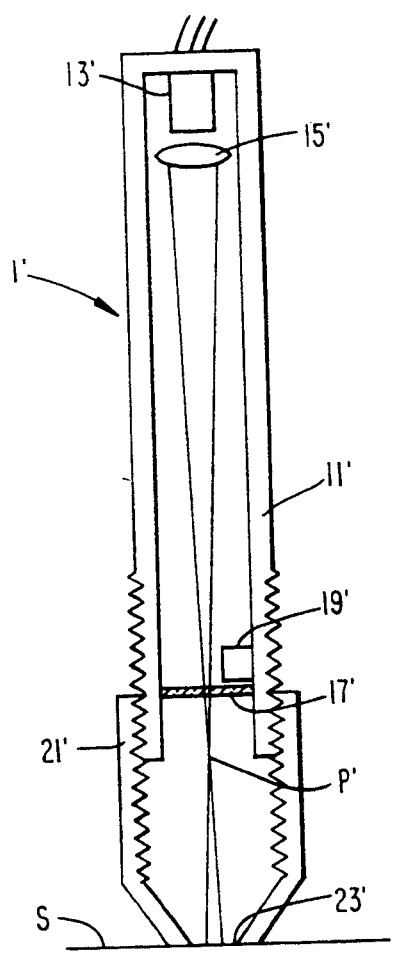
FIGS. 2A and 2B illustrate in cross section a second embodiment of the invention, in the form of a wand type reader, with a second adjustable spacer design set at two different positions to provide two different beam spot sizes.
Figure 2B:
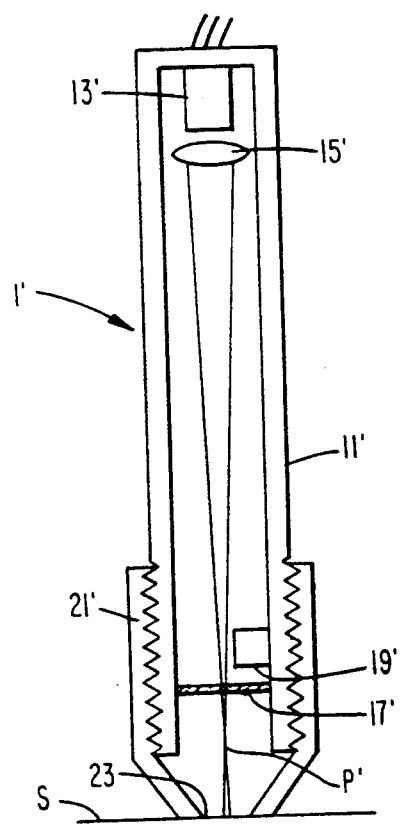

The second embodiment of the invention, using a threaded spacer structure appears in FIGS. 2A and 2B. Here, the bar code wand 1' includes a housing 11' which contains a VLD 13'. The VLD 13' emits light which passes through the lens 15' and is focused to a point P'. The focused light passes through a transparent member 17' which serves to seal the wand against dust and debris. The housing 11' also contains a detector 19', located behind the transparent sealing member 17, for sensing light reflected back from information scanned using the wand.

The wand also includes a spacer member 21'. The male threaded outer surface of the fore end portion of housing 11' engages the female threaded distal end of the spacer 21'. Thus, the spacer 21' can be screwed onto the fore end portion of the housing 11' until it reaches a desired position for reading a particular density. The fore end of the spacer 21' tapers to a point through which is formed aperture 23'. Light from the VLD and emerges from the aperture 23'.

Comparison of FIG. 2A to FIG. 2B demonstrates how repositioning of the spacer in the second embodiment will produce different beam spot diameters on the surface of the information during scanning. In FIG. 2A, the spacer is threaded to a position relatively far forward on the fore end of the housing 11'. When the tip of the spacer contacts the surface S, the distance between the focal point P' and the surface S is relatively long, and the beam spot is large. In contrast, in FIG. 2B the operator has turned the spacer 21' so that the threads position the spacer relatively far back on the housing 11'. When the tip of the spacer contacts the surface S, the distance between the focal point P' and the surface S is relatively short, and the beam spot is small.

The invention of FIGS. 2A and 2B allows an operator to adjust a single wand to read a range of symbol densities. To change from a setting for one density to a new setting for another density, the operator simply turns the spacer 21' until it reaches a new position, and scans the wand across encoded information. If scanning is unsuccessful, the operator can repeat this procedure at another spacer position until the scanning is successful.

Figure 3A:
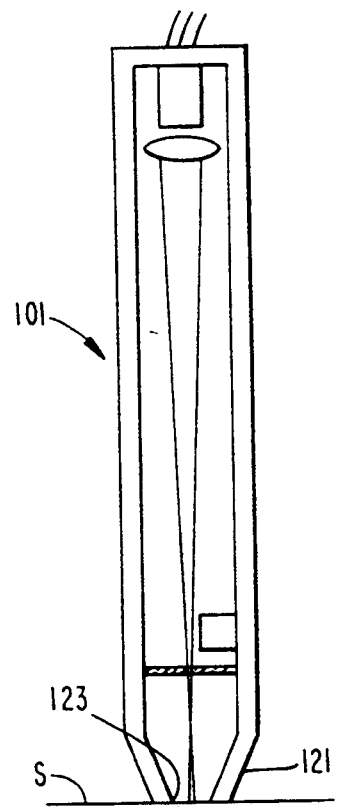
FIGS. 3A, 3B and 3C illustrate in cross section a third embodiment of the invention, in the form of a wand type reader using detachable second spacers of different lengths.
Figure 3B:
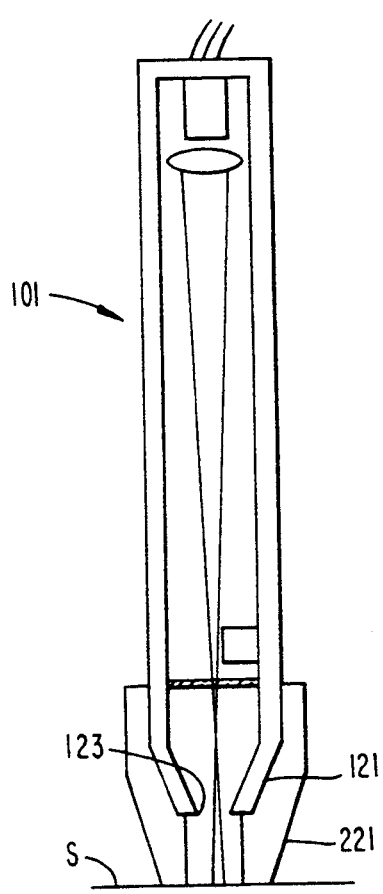
Figure 3C:
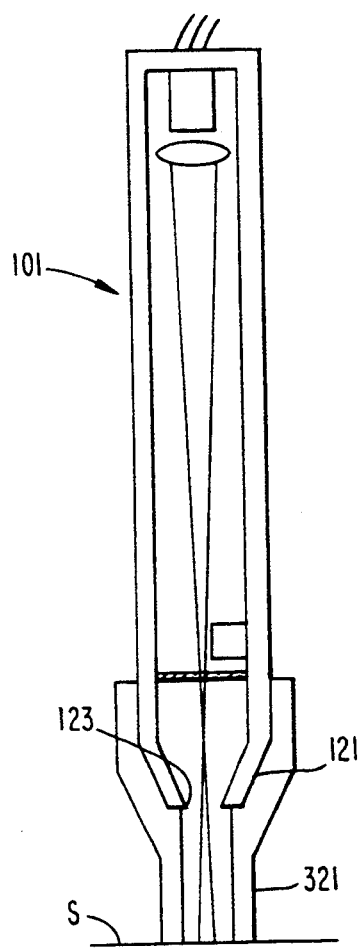

In the third and perhaps the simplest preferred embodiment of the invention, shown in FIGS. 3A–3C, the laser wand 101 has a structure similar to that of the wand used in the earlier described embodiments. For example, the cylindrical wand housing contains a VLD, a lens, a photodetector and a transparent sealing member. In the third embodiment, however, the fore end of the housing is designed for direct contact with the surface S on which the bar code appears. The fore end of the housing tapers, as shown at 121, to a circular aperture 123. The VLD emits light which is focused by the lens and passes through the transparent member to emerge through opening 123. The light will reflect back off of the bar code or other optically encoded information on the surface S, and the photodetector will sense the reflected light.

When the tapered tip 121 of the wand 101 contacts the surface S, during scanning across a code, the distance between the focal point and the surface S is relatively short. Consequently, the beam spot is small, as shown in FIG. 3A. The small beam spot would be appropriate for reading high density encoded information, such as very small size bar code symbols.

To increase the spot size, for example to read lower density bar codes, the operator inserts the fore end of the wand 101 into a spacer 221, as shown in FIG. 3B. The inside diameter of the distal end of the spacer 221 is minimally larger than the outside diameter of the fore end portion of the wand 101. This produces a friction or pressure fit of the spacer 221 on the wand 101. The tension between the spacer and the wand should be sufficient to retain the spacer in place on the tip of the wand during scanning but still allow an operator to manually attach and remove the spacer from the wand.

The spacer 221 serves to lengthen the distance between the focal point and the surface S. With the spacer 221 mounted on the tip of wand 101, the operator contacts the fore end of the spacer to the surface S and scans the wand across the code. The increased distance between the focal point and the surface S causes the spot size of the beam at the point of impact on the surface to increase. FIG. 3B shows that the beam at the point of impact will have a larger diameter than would be the case without the spacer, as shown in FIG. 3A. The larger spot size of FIG. 3B would be suitable for reading of medium density bar code symbols.

To further increase the spot size, to read extremely low density bar codes such as those printed by dot matrix printers, the operator inserts the fore end of the wand 101 into another spacer 321, as shown in FIG. 3C. As with the spacer 221, the spacer 321 is designed to provide a friction or pressure fit of the spacer 321 onto the tip of wand 101. This serves to retain the spacer 321 in place on the tip of the wand 101 but still allows an operator to manually attach and remove the spacer 321 from the wand.

The spacer 321 includes a cylindrical extension on the tip thereof which makes the spacer 321 longer than the spacer 221. This extension can take virtually any shape the designer chooses so long as it increase the length of the spacer by a desired amount. Spacer 321 therefore provides a still longer distance between the focal point and the surface S than did the wand 101 alone (FIG. 3A) or the wand with the spacer 221 attached (FIG. 3B). Again, the increased distance between the focal point and the surface S serves to increase the spot size of the beam at the point where the diverging light beam impacts on the scanned surface S. Comparing FIGS. 3A–3C, it should be clear that the longer distance provided by spacer 321 produces the largest spot size. With the spacer 221 mounted on the tip of wand 101, the operator contacts the fore end of the spacer to the surface S and scans the wand across the code, and during such scanning the larger spot size would adapt the wand to effectively read low density bar code symbols.

In use, an operator adds or changes spacers whenever a scan is unsuccessful, and then tries to scan the code again. This procedure can be repeated, as necessary until the operator finds the correct spacer and spot size for the current code.

Although shown as using two different length detachable spacers 221, 321, more spacers can be provided. For many applications, however, one spacer will be enough. The operator would use the wand without a spacer for small high density symbols and at least some mid-range density symbols. The operator would use the wand with a long spacer, such as spacer 321, for the large low density symbols and the remaining mid-range density symbols. A wire or chain or the like normally connects the spacer or spacers to the housing of the wand, to ensure that the spacers remain with the wand.

In the embodiments of FIGS. 1–3, each spacer or wand tip which contacts the surface comprises only a circular opening. There are not optical elements at the point of contact with the surface. This structure eliminates the problems of damaging an optical element by contact of the element with the surface and the resultant need for element replacement.

Although FIGS. 1–3 show the VLD and the lens as separately mounted elements, they could easily comprise elements of a combined laser and optics assembly. For example, the assembly might include an elongated hollow tube, a laser diode fixedly mounted at one end of the tube, and a lens barrel mounted at the opposite end of the tube. The lens barrel would contain a focusing lens, and if necessary, an aperture stop. Together, the lens and aperture would define the focal point and the beam diameter at various distances beyond the focal point. U.S. Pat. No. 4,816,660 discloses one example of such an assembly.

Figure 4:
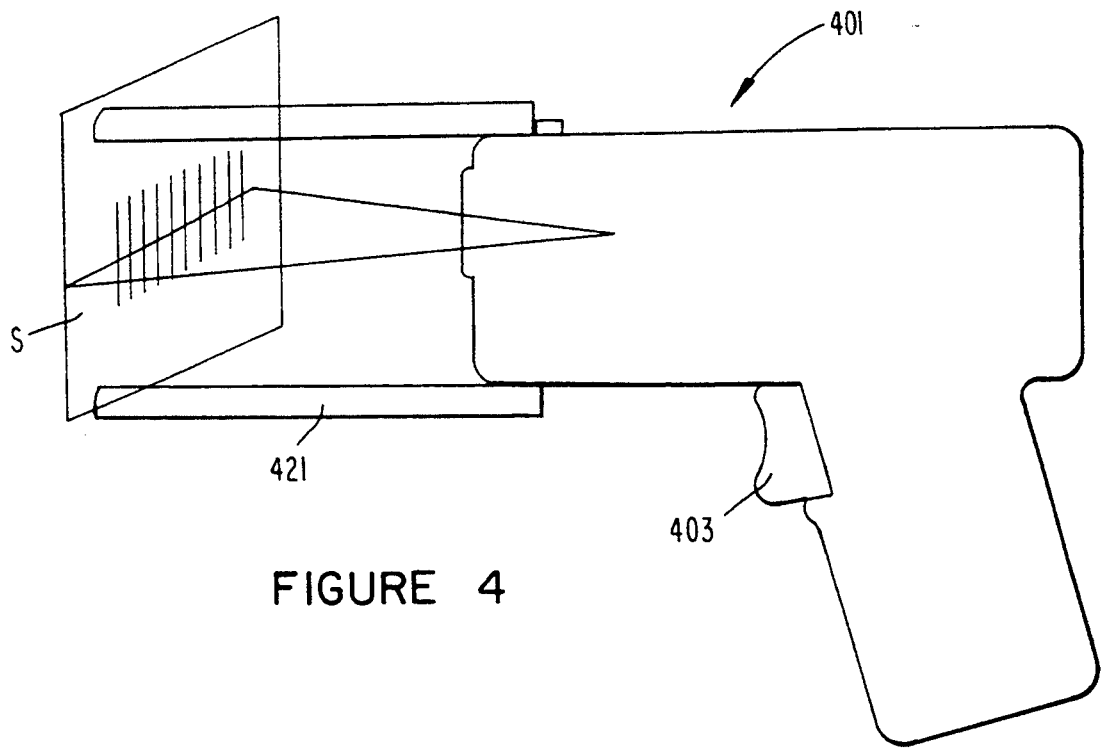
FIG. 4 illustrates a further embodiment of the invention, in the form of a pistol grip type moving spot scanner, with a spacer.

In each of the above discussed embodiments, the shape of the spacers can vary greatly, to adapt to different bar code reader designs and/or specific information scanning applications. For example, it is possible to adapt the spacer for use on a moving spot type laser scanner, as shown in FIG. 4. As illustrated, the scanner 401 is a pistol grip type moving spot laser scanner. Normally, the operator holds the scanner 401 in one hand, points the scanner at the code to be scanned and pulls the trigger 403. The scanner emits a beam of light which reciprocates back and forth across the code, and a photodetector within the scanner housing senses the light reflected back from the code.

To provide a desired long fixed spacing from the optically encoded indicia, particularly for scanning dot matrix type low density bar codes, the operator places a spacer 421 on the fore end of the scanner 401. The operator holds the assembly so that the spacer 421 contacts the surface S on which the code is formed. The spacer positions the scanner 401 back away from the code to increase the distance between the laser source and the code. This again serves to increase the size of the beam spot at the point of impact as the beam scans across the surface. When the operator activates trigger 403, the scanner 401 produces a moving laser beam with a large spot size and scans that beam across the dot matrix bar code.

Figure 5:
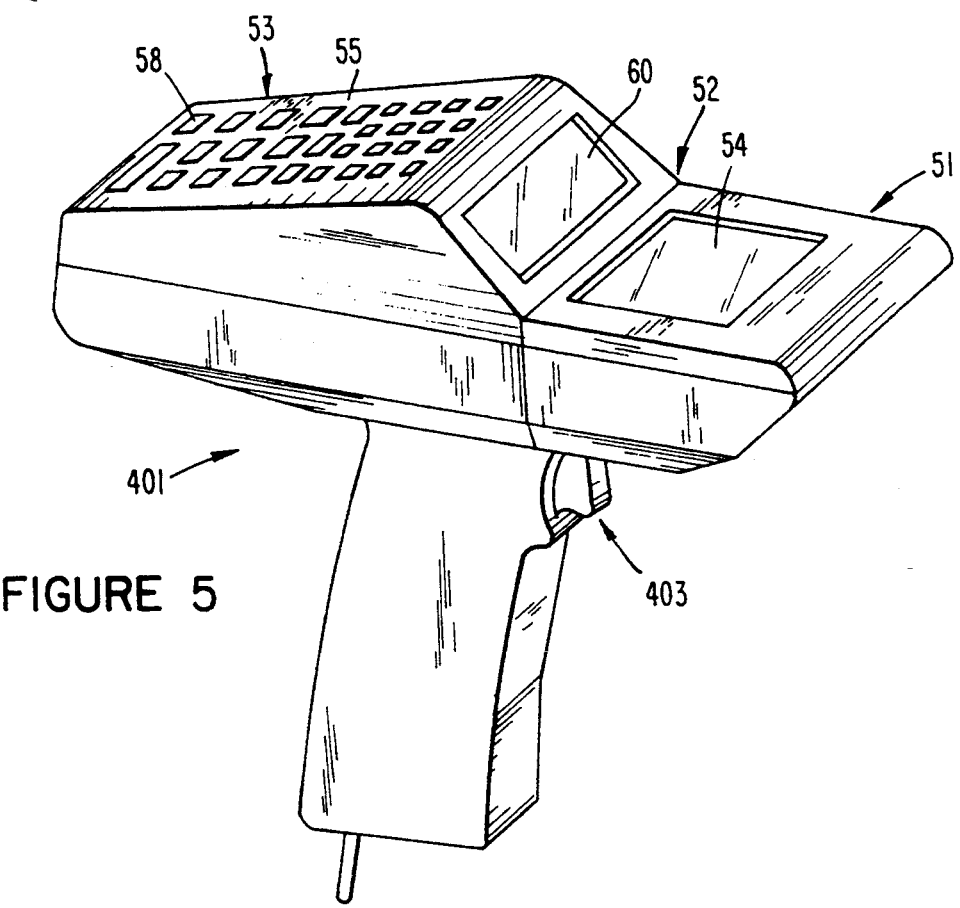
FIG. 5 illustrates a further embodiment of the invention, in the form of a pistol grip type moving spot scanner with a touch screen display and input device and a keyboard forming an integrated data input terminal.

The optical reader of the present invention can take many forms, and may be combined with other means to enter data other than the optically encoded data. FIG. 5 shows an exemplary embodiment of the pistol grip type moving spot laser scanner 401. The scanner includes a generally gun-shaped housing having an elongated body portion including a front region 51, a rear region 53, and an intermediate body region 52. To detect optically encoded indicia, the housing contains a moving spot optical scanner and associated photodetector.

Commonly assigned application Ser. No. 07/193,265 filed May 11, 1988, discloses a mirrorless optical scanner, and application Ser. No. 07/699 417 filed on May 13, 1991, now U.S. Pat. No. 5,191,197 discloses incorporation of such a scanner in a modular scanner component system facilitating use of the scanner in a variety of different housing configurations. For the moving spot scanner embodiments, the present invention preferably uses a scanner similar to that disclosed in these two copending applications, as discussed below with regard to FIG. 7. The disclosures of these two applications are incorporated herein by reference in their entirety.

The scanner transmits a light beam through the forward facing inclined window 60 formed in the intermediate body region 52. When the operator aims the scanner at the indicia, e.g. at the bar code, the beam passes along a light path toward the indicia, and the photodetector will receive light reflected from the indicia to produce electrical signals representative of the indicia.

A keyboard 55, disposed on the upper surface in the rear region 53 of the housing includes a number of individual keys 58. This positioning of keyboard 55 places it out of the path of the emitted beam and out of the path of the reflected light. An operator manually enters alphanumeric data and/or selects specific functions by activation of the keys 58 of the keyboard 55. Because of its location, when the operator activates the keys, the operator's fingers will not block or otherwise interfere with the emitted light beam or the light reflected from the scanned symbols.

A display device 54 is located on the upper surface of the front region 51 of the housing for displaying a variety information. In this embodiment, the display is oriented so that the flat upper surface of the display 54 is parallel to the path of the emitted beam of light. The display 54 is a touch sensitive display and data input device. When certain information is displayed calling for a user input, the operator can select functions or input certain related data by simply touching the corresponding area of the display screen 54. The display and touch panel of device 54 may comprise the integrated liquid crystal display and optical touch panel disclosed in U.S. Pat. No. 4,916,308 to Meadows.

Figure 6A:
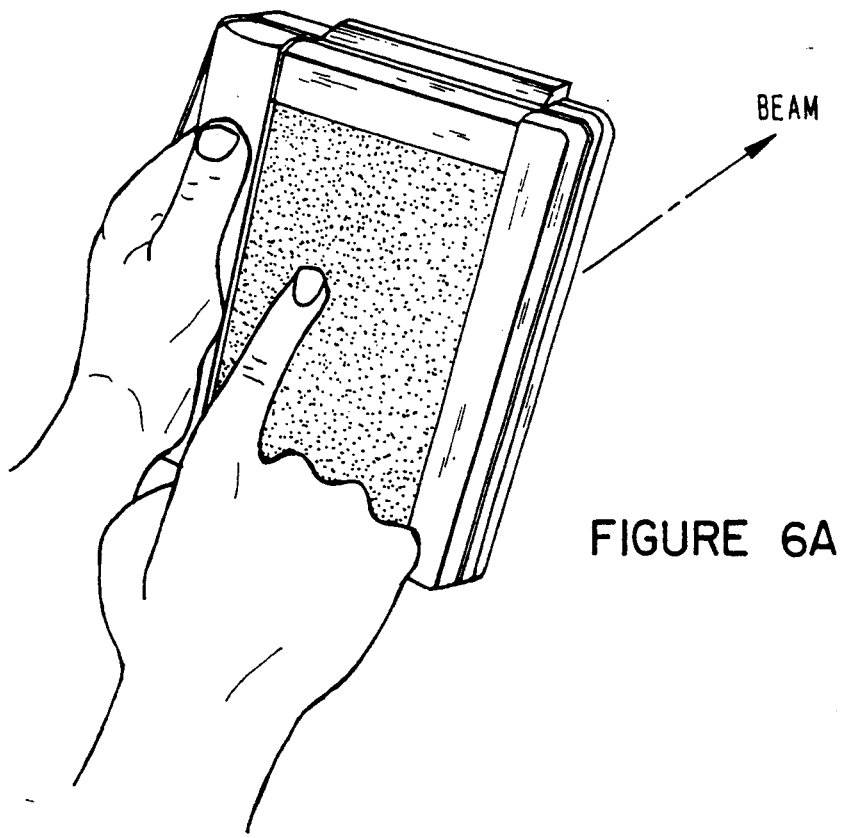
FIGS. 6A and 6B show another embodiment of an integrated data input terminal having a moving spot scanner and a touch screen display and input device.
Figure 6B:
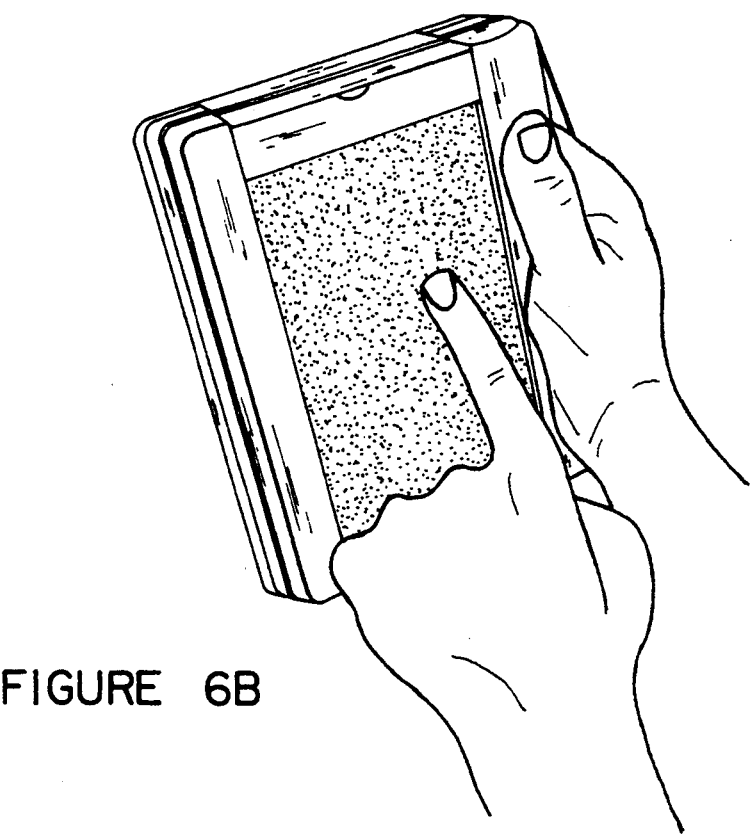

The embodiment of FIGS. 6A and 6B, incorporates the moving spot scanner into a flat panel or tablet type unit with a touch sensitive display device similar to but somewhat larger than the touch sensitive display 54 used in the embodiment of FIG. 5. The scanner is positioned within the flat panel unit so as to emit the beam through a window in the rear surface of the unit.

A switch within the panel, for example a mercury switch, is sensitive to the orientation of the device. When oriented for holding with the right hand (FIG. 6B), the switch conditions the associated electronics to operate the panel as a display and touch sensitive data input device. In this mode, the touch panel allows the user to input function selections and/or data simply by touching a position on the display screen, as in FIG. 6B. When oriented for holding with the left hand, as in FIG. 6A, the switch conditions the associated electronics to operate the unit as an optical reader. In this mode, a touching of the display panel acts as a trigger to activate the moving spot scanner and read optically encoded information scanned by the emitted beam.

In still further embodiments, the present invention incorporates elements of an optical reader into the stylus of a tablet type data input device. As shown for example in FIG. 7, the stylus arrangement 10 comprises a hand-held housing 12 containing a lightweight, high-speed, miniature scanning motor 20 similar to that described in U.S. Pat. No. 4,496,831. The motor 20 repetitively drives an output shaft 22 in alternate circumferential directions over arc lengths less than 360° in each direction about an axis along which the shaft extends. U.S. Pat. No. 4,496,831 provides structural, functional and operational details of the motor 20 and of the associated motor control circuitry 24.

Figure 7:
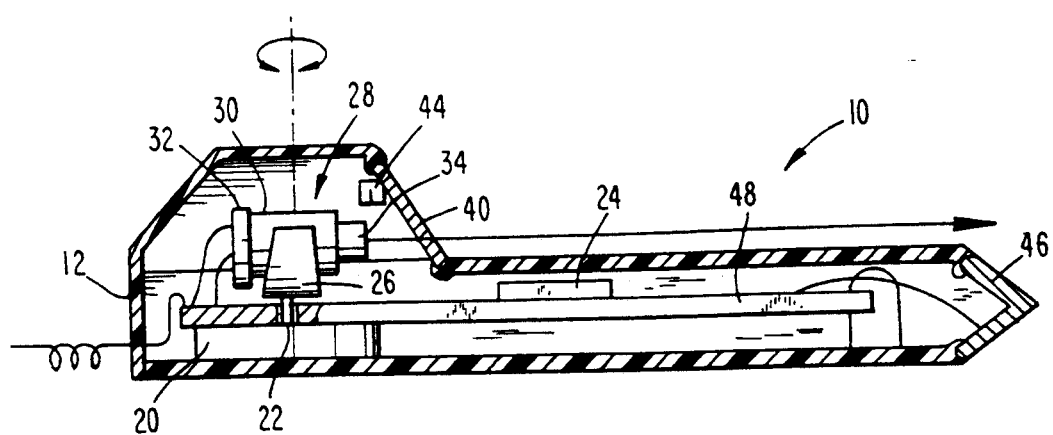
FIG. 7 illustrates in cross section an embodiment of the invention, in the form of an electronic stylus incorporating a moving spot optical scanner.

A generally U-shaped support structure 26 is mounted at the end of the shaft 22 of motor 20, in the stylus 10 of FIG. 7. U-shaped structure 26 supports a laser emitter and optics assembly 28. As the motor 20 repetitively drives output shaft 22 in alternate circumferential directions, the subassembly 28 and the support structure 26 jointly oscillate and turn with the shaft 22.

The subassembly 28 includes an elongated hollow tube 30, a laser diode 32 fixedly mounted at one axial end region of the tube 30, and a lens barrel 34 mounted at the opposite axial end region of the tube 30. The lens barrel contains a focusing lens (not shown); and the lens barrel may provide an aperture stop, if necessary, to define the beam diameter and thereby the effective sensing spot of the scanner. The focusing lens is preferably a plano-convex lens, but may be spherical, convex or cylindrical. U.S. Pat. No. 4,816,660 describes the subassembly 28 in detail. The solid state laser diode 32, of the subassembly 28, generates an incident laser beam, either in the invisible or visible light range. The lens focuses the laser beam such that the beam cross-section or beam spot will have a certain waist size at distances within a working range relative to the housing 12. The focused beam passes through the window 40; and during the alternate, repetitive oscillations of the shaft 22, as the support 26 and the subassembly 28 concurrently oscillate, the beam spot is be swept in an arc across the encoded information or bar code symbol.

A portion of the light reflected off the symbol passes along a return path back through the window 40 to a photodetector 44. Photodetector 44 senses the variable intensity of the returning portion of the reflected laser light and generates an electrical analog signal indicative of the detected variable light intensity. In the illustrated embodiment, the photodetector 44 is stationarily mounted, but could be mounted on the support structure 26 for oscillation with the laser and optics subassembly 28.

In addition to the control circuitry 24 for controlling operation of motor 20, the printed circuit board 48 may contain signal processing circuitry and microprocessor control circuitry for converting the analog electrical signal to a pulse signal, and for analyzing the pulse signal widths and spacings to derive digital data for the encoded symbols scanned by the beam.

To scan encoded information using the stylus, the user points the tip of the stylus 10 at the information and activates a trigger button (not shown). The laser diode emits a beam which scans the encoded information, and the photodetector outputs an analog electrical signal representative of any scanned symbols. A digitizer processes the analog signal to produce a pulse signal where the widths and spacings between the pulses correspond to the widths of the bars and the spacings between the bars; and the pulse signal from the digitizer is applied to a decoder. The decoder first determines the pulse widths and spacings of the signal from the digitizer. The decoder then analyzes the widths and spacings to find and decode a legitimate bar code message.

If the digitizer and decoder are elements of the circuitry or software included on board 48, then the decoded characters are transmitted to the associated computer. In the embodiment of FIG. 7, a cable carries the digital data representing the decoded characters to the associated computer, e.g. via the connection to the display and resistive stylus input tablet. Alternatively, if the decoder and/or the digitizer are elements of the circuitry or software included in the computer or the associated tablet, then the cable carries the analog output of the photodetector or the pulse signal output of the digitizer.

In the embodiment of FIG. 7, the scanning beam is emitted from the rear section of the stylus toward the tip. To ensure proper spacing, the user may place the tip of the stylus in contact with the surface on which the information appears, in which case the body of the stylus serves as a spacer similar to the spacer 421 shown in FIG. 4.

For X, Y positional data input, the stylus of FIG. 7 would be used in combination with a data input tablet, such as the resistive tablet disclosed in U.S. Pat. No. 4,972,496. The stylus includes a conductive contact 46 at the tip to which a source voltage is applied. The stylus may contain a voltage source, such as battery (not shown), or the system may supply the voltage to the stylus 10 from an external source such as the system power supply via the cable connection to the tablet. The tablet includes an input screen for determining an X, Y position on an electrically resistive plate. To input data, the operator touches the tip 46 of the stylus to the input screen. This applies the voltage from the tip to the screen at the touched position. The touched position is charged by the stylus with a positive voltage with respect to a plurality of plate measurement points, typically at corners of the screen. The voltages at these plate measurement points vary as a function of the distance from the plate measurement points to the actual touch position of the pen. These voltages are sequentially measured in the X and Y directions by using conventional means, such as an interface/multiplexer. After analog-to-digital conversion of the detected voltages, a microcontroller checks to ensure the signal's numerical value is "valid" (e.g., is within the possible range of voltages), and then converts the voltages to X and Y distances.

As discussed above, the stylus embodiment uses resistive contact type electronics such as disclosed in U.S. Pat. No. 4,972,496, to provide X, Y data input to a digitizer tablet and display device. Other forms of stylus electronics, however, can be readily adapted to use in the inventive stylus. For example the stylus electronics could rely on a light pen technology, on capacitive contact detection circuitry, pressure sensitive contact detection circuitry, ultrasonic proximity detection circuitry, etc. In each case, the key feature is that the stylus incorporates both the electronics necessary to provide X, Y position data input to an electronic tablet and the scanner and detector and any associated electronics of a optical reader such as a bar code scanner.

Also, in the above embodiment, a cable provides power to the stylus and carries various signals from the stylus to the associated computer system. Alternatively, the stylus may include a battery to supply power and a wireless transmitter. The transmitter could be a radio transmitter, an infrared transmitter, an ultrasonic transmitter or any other type wireless transmitter. The transmitter sends analog or digital signals resulting from the scan of the optically encoded information to the associated computer system.

Figure 8:
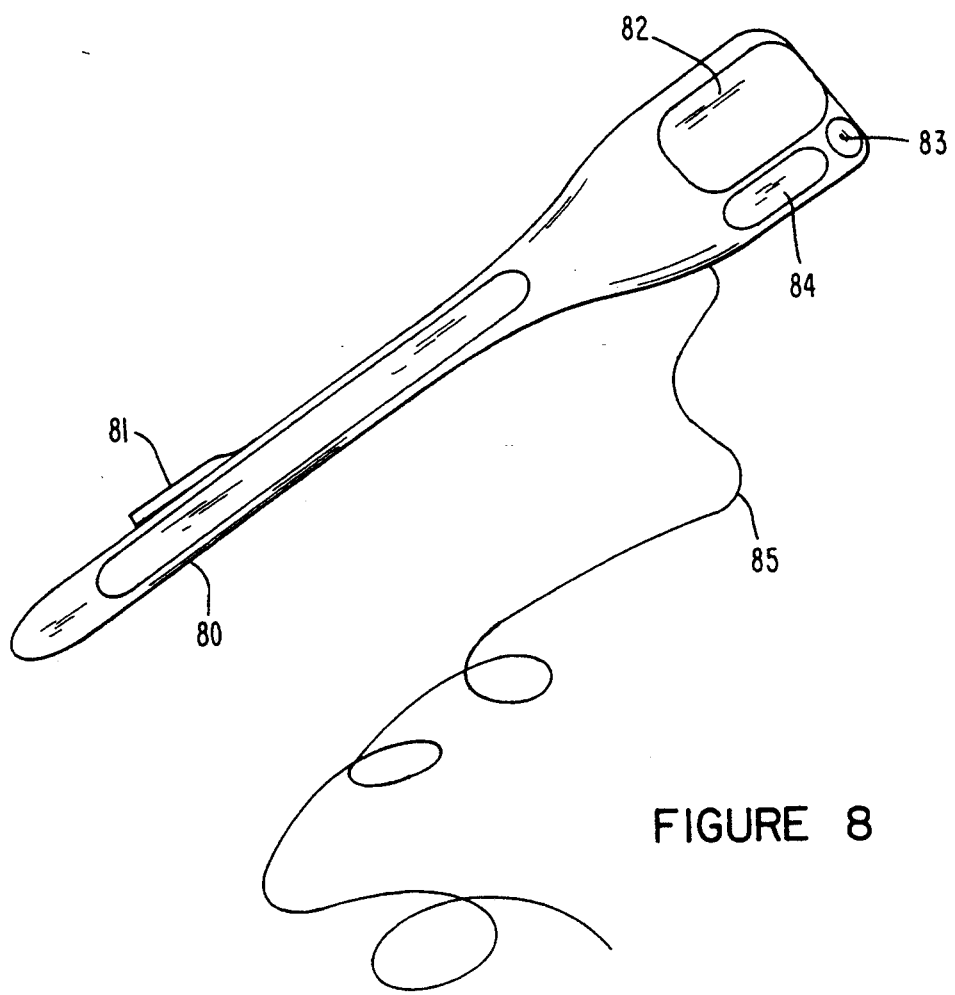
FIG. 8 shows an alternate embodiment of the stylus incorporating a moving spot optical scanner.

The stylus of FIG. 7 directs the scanning beam from the rear section of the stylus toward the tip. In alternate embodiments of the stylus, shown in FIGS. 8 and 9, the scanner emits a beam in the opposite direction. As shown in FIG. 8, the stylus is shaped like a pen with an enlarged distal end. The enlarged distal end of the stylus housing contains a moving beam laser scanner engine 82. The scanner engine could, for example, comprise a scanner motor, a support structure mounted on the motor shaft and a laser and optics subassembly similar to components 20, 26 and 28 discussed above relative to FIG. 7, or the scanner engine could comprise any conventional emitter and scanning optics which are small enough to fit into a stylus housing of convenient dimensions.

The enlarged distal end of the stylus housing also contains a photodetector 83, for example a light sensitive photodiode. The scanner engine 82 emits a scanning beam through a window formed in the rear surface of the stylus housing. A portion of the light reflected off the symbol passes along a return path back through the window to the photodetector 83. Detector 83 senses the variable intensity of the returning portion of the reflected laser light over a field of view and generates an electrical analog signal indicative of the detected variable light intensity.

The housing also contains electronics 84 for the optical reader. These electronics will include at least the circuitry necessary to drive the scanning motor, and may include circuitry such as the digitizer and/or decoder for processing the signal from the photodetector. A scan switch 81 mounted near the fore end portion of the stylus serves as a trigger to activate the scanning engine 82, photodetector 83 and scanner electronics 84. The cable 85 optically carries signals representing the information scanned to the associated computer system. To operate the optical reader, the user holds the fore end portion of the stylus, points the distal end of the stylus at the information to be scanned and presses switch 81.

The fore end portion of the stylus contains the electronics 80 necessary to operate the stylus for X, Y positional data input to a digitizer tablet. The stylus could include a conductive contact at the tip and means to apply a source voltage to the tip, as in FIG. 7, or any other form of stylus electronics as mentioned above. In this embodiment, the cable 85 supplies all power to the stylus for operation of both the stylus electronics 80 and the scanning engine 82, photodetector 83 and scanner electronics 84 of the optical reader system.

Figure 9:
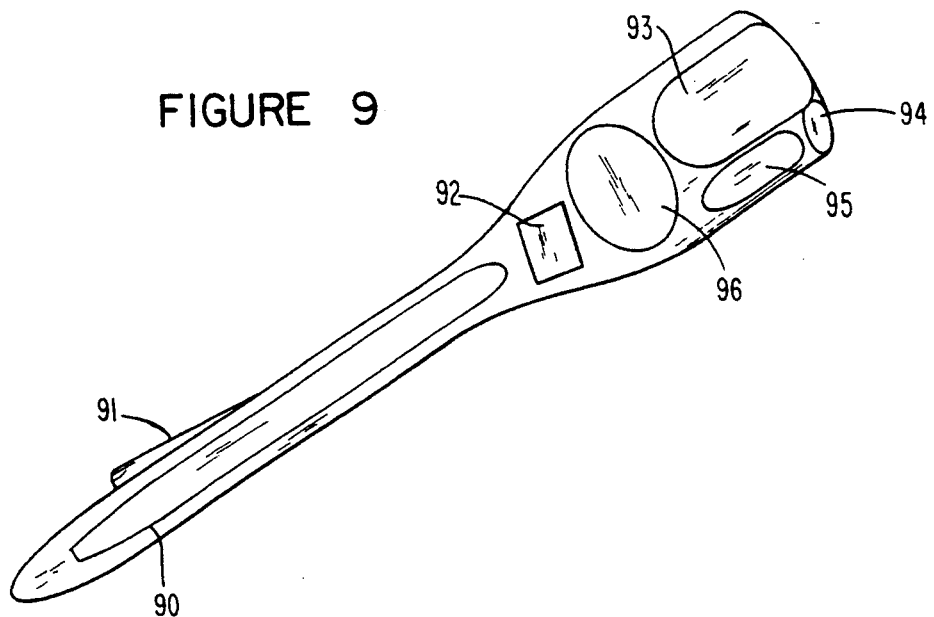
FIG. 9 shows an alternate embodiment of the integrated stylus and scanner, similar to that of FIG. 8, but using a wireless communication link to the associated computer system.

FIG. 9 shows a combination stylus and optical reader similar to that of FIG. 8 but using a wireless transmitter to send signals representing scanned information to the associated computer system. The stylus of FIG. 9 again is shaped like a pen with an enlarged distal end. The enlarged distal end of the stylus housing contains a moving beam laser scanner engine 93, similar to the engine 82 discussed above. The enlarged distal end of the stylus housing also contains a photodetector 94, for example a light sensitive photodiode. The scanner engine 93 emits a scanning beam through a window formed in the rear surface of the stylus housing. A portion of the light reflected off the symbol passes along a return path back through the window to the photodetector 94. The housing also contains electronics 95 for the optical reader which include at least the circuitry necessary to drive the scanning motor, and may include circuitry such as the digitizer and/or decoder for processing the signal from the photodetector. A scan switch 91 mounted near the fore end portion of the stylus serves as a trigger to activate the scanning engine 93, photodetector 94 and scanner electronics 95. Again, to operate the optical reader, the user holds the fore end portion of the stylus, points the distal end of the stylus at the information to be scanned and presses switch 91.

The fore end portion of the stylus contains the electronics 90 necessary to operate the stylus for X, Y positional data input to a digitizer tablet. The stylus could include a conductive contact at the tip, as in FIG. 7, and a battery 92 to apply a source voltage to the tip, or the stylus could contain any other form of stylus electronics as mentioned above.

A wireless transmitter 96 sends analog or digital signals resulting from the scan of the optically encoded information to the associated computer system. The transmitter could be a radio transmitter, an infrared transmitter, an ultrasonic transmitter or any other type wireless transmitter. In this embodiment, the battery 92 supplies all power to the stylus for operation of both the stylus electronics 90 and the scanning engine 93, photodetector 94 and scanner electronics 95 of the optical reader system and power to the wireless transmitter 96.

Figure 10A:
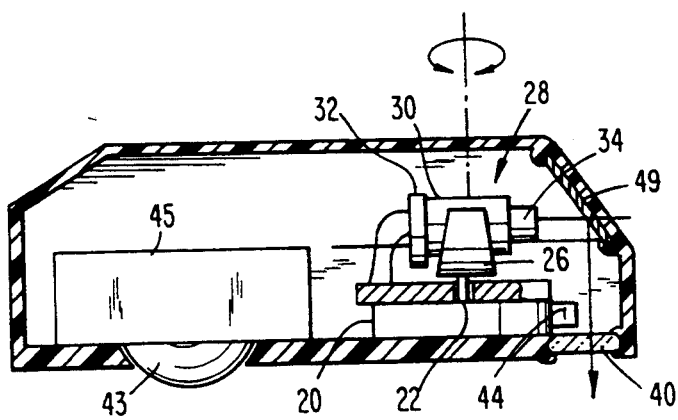
FIG. 10A is a cross sectional view and FIG. 10B is a top plan view of an embodiment of the invention wherein the optical scanner is incorporated into a mouse type input device.

In a further embodiment, the present invention incorporates the optical scanner, for reading optically encoded indicia, into a mouse type data input device. This embodiment would include a mouse with relatively standard electronics. FIG. 10A, for example, shows a track ball 43 and associated movement detection electronics 45. The housing of the mouse also contains a moving spot optical scanner module and associated photodetector.

Figure 10B:
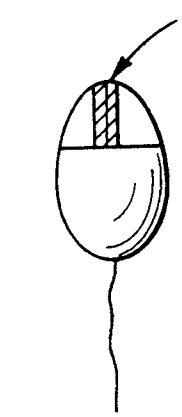

The housing is adapted for grasping, typically in the palm of a user's hand, for manual movement across a flat surface. When located on the flat surface, the track ball extends through an opening in the bottom surface of the housing. During movement of the mouse across the surface, the track ball 43 engages the surface, and the associated electronics 45 detect the extent of the manual movement of the device across the surface. One or two keys are located in the top of the housing (see FIG. 10B). Manual depression of these keys operates switches (not shown) within the mouse housing to provide an operator input. These elements of the embodiment of FIGS. 10A and 10B provide standard "mouse" type inputs to an associated computer.

As in the stylus of FIG. 7, the mouse arrangement of FIG. 10A comprises a housing containing a lightweight, high-speed, miniature scanning motor 20 similar to that described in U.S. Pat. No. 4,496,831. The motor 20 repetitively drives an output shaft 22 in alternate circumferential directions about an axis along which the shaft extends over arc lengths less than 360° in each direction. U-shaped structure 26 supports a laser emitter and optics assembly 28. As the motor 20 repetitively drives output shaft 22 in alternate circumferential directions, the subassembly 28 and the support structure 26 jointly oscillate and turn with the shaft 22. The subassembly 28 includes an elongated hollow tube 30, a laser diode 32 fixedly mounted at one axial end region of the tube 30, a lens barrel 34 mounted at the opposite axial end region of the tube 30. The lens barrel contains a focusing lens (not shown) such as a plano-convex lens, but may be spherical, convex or cylindrical.

The solid state laser diode 32, of the subassembly 28, generates an incident laser beam, either in the invisible or visible light range. The lens focuses the laser beam which is reflected off of a mirror 49, and the focused beam passes through the window 40. In this embodiment, the window 40 is formed in the bottom surface of the mouse housing such that the beam cross-section or beam spot will have a certain waist size at distances within a working range relative to the housing. Instead of using the mirror 49, the motor, support and emitter and optics assembly could be positioned to emit light downward through window 40 directly. In either case, during the alternate, repetitive oscillations of the shaft 22, as the support 26 and the subassembly 28 concurrently oscillate, the beam spot sweeps through an arc across the encoded information or bar code symbol positioned a distance below the lower surface of the mouse housing.

The scanner emits a beam of light from the bottom surface of the mouse housing, and the photodetector 44 detects the variable intensity of the returning portion of the reflected light and generates an electrical analog signal indicative of the detected variable light intensity. Typically, at least the digitizer for converting analog signals from the photodetector to a pulse signal would also be located within the housing of the mouse.

The embodiment of FIGS. 10A and 10B includes a third trigger on the mouse to activate the optical reader components (see plan view of FIG. 10B). Typically, the user picks up the mouse, orients it so as to direct the beam along a path toward the information to be scanned, and activates the third trigger switch 42 on the top surface of the housing to activate the moving spot scanner and associated photodetector. When the user has not activated switch 42, the unit operates as a standard computer mouse.

Figure 11:
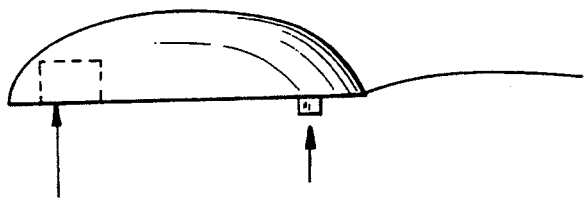
FIG. 11 illustrates an alternate embodiment of the mouse type input device with the incorporate optical scanner.

A second version of the mouse includes a contact switch 42' mounted in the lower surface of the housing, as shown in FIG. 11. The mouse includes the components of an optical reader engine or module 70 similar to the components 20, 26 and 28 discussed above and includes a standard track ball and position detection electronics similar to 43 and 45. The contact switch detects when the mouse is resting on a surface and controls the device to provide standard mouse type signals to the associated computer. When the operator lifts the mouse off the surface, however, the contact switch triggers operation of the optical reader module 70. The operator then points the mouse so that the beam scans across the optically encoded indicia.

In the mouse embodiments illustrated in the drawings, the mouse connects to the associated computer via a cable (FIGS. 10B and 11). This cable could connect to a port on the back of the computer or to a port on the keyboard. The cable supplies all necessary power to the movement detection electronics 45 and any circuitry needed to detect button operation, and it supplies all necessary power to the laser diode 32 and motor 20 of the scanner, the photodetector 44 and the associated electronics for processing the signal from the photodetector. As an alternative, the mouse could incorporate a battery and a wireless transmitter similar to the transmitter 96 in the embodiment of FIG. 9. The transmitter would send analog or digital signals resulting from the scan of the optically encoded information to the associated computer system and the signals relating to the mouse movement and button operation. The battery would supply all power to the mouse for operation of both the mouse type electronics and the optical scanning, detection and signal processing electronics for optical reading of indicia.

Typically, the light beam emitted by the scanners of the present invention will be in the visible range of the spectrum, for example red light. Consequently, the beam scan across the code or indicia will be visible to the operator. The decode logic may reside within the same housing as the scanner, for example in the integrated terminal embodiment, or the decode logic may be software resident in the associated computer system. The decode logic can provide a "beep" signal as an audible output upon detection of a valid read result. The visible beam and the "beep" signal provide feedback to the operator as to the operation of the scanner.

Although the integrated terminals of FIGS. 5–11 have been described as using a moving spot scanner, it would be a simple matter to substitute a fixed beam emitter. For example, a fixed laser emitter and optics, such as shown in the wand of FIG. 1A, might replace the components for producing the scanning laser.

We claim:

1. An electronic stylus for use with a computer having a digitizer, said stylus comprising:

a light emitter for emitting light for illumination of optically encoded information;

a photodetector for sensing light reflected from the illuminated optically encoded information and producing an electrical signal representative of the optically encoded information;

stylus electronics for providing positional input data by contacting a digitizer tablet with said stylus; and a stylus housing containing said light emitter, said photodetector and said stylus electronics, said stylus housing having a tip disposed at a fore end of said housing adapted for contact with the digitizer tablet;

wherein said light is emitted from other than said fore end of said housing.

2. An apparatus as in claim 1, further comprising a wireless transmitter for sending data signals representative of the optically encoded information from said apparatus to a computer.

3. An apparatus as in claim 1, wherein said stylus housing includes a fore end portion which tapers to a point for contact with a digitizer tablet during operation of the apparatus as a stylus.

4. An apparatus as in claim 3, wherein a distal end of said housing contains the light emitter and the photodetector, said light emitter being oriented to emit the light from said distal end of said housing in a direction toward the point of the fore end portion of the housing.

5. An apparatus as in claim 3, wherein a distal end of said housing contains the light emitter and the photodetector, said light emitter being oriented to emit the light from said distal end of said housing in a direction away from the fore end of the housing.

6. An apparatus as in claim 3, wherein:

said housing is elongated in a direction;

said fore end portion contains said stylus electronics, and a distal end portion contains said light emitter and photodetector; and said distal end portion has a cross sectional area orthogonal to said direction which is larger than a cross sectional area of said fore end portion orthogonal to said direction.

7. An apparatus as in claim 1, wherein said digitizer tablet includes signal processing circuitry for processing a signal corresponding to said electrical signal.

8. An apparatus as in claim 1, wherein a distal end of said housing contains said light emitter and said light is emitted from said distal end of said housing.

9. An apparatus as in claim 1, wherein:

said tip and said light emitter are separated by a distance; and said light emitter is disposed from said optically encoded information by said distance during the emitting of light.

10. An apparatus as in claim 1, wherein said tip is a conductive electrical contact.

11. An apparatus as in claim 1, wherein said light emitter includes a scanning motor for repetitively oscillating a light source, and said emitted light is a scanning light beam.

12. An apparatus as in claim 11, wherein said scanning motor also repetitively oscillates said photodetector.

* * * * *